United States Patent
Gollner et al.

(10) Patent No.: US 11,593,825 B2
(45) Date of Patent: Feb. 28, 2023

(54) DISTRIBUTED MERCHANDISE MANAGEMENT SYSTEM

(71) Applicant: LOCALOFFERCOMPASS UG (HAFTUNGSBESCHRANKT), Paderborn (DE)

(72) Inventors: Thomas Gollner, Paderborn (DE); Jan-Hendrik Schwarz, Hamburg (DE); Sebastian Gottschalk, Paderborn (DE); Stefan Sauer, Paderborn (DE)

(73) Assignee: RATOJA GMBH, Bad Lippspringe (DE)

( * ) Notice: Subject to any disclaimer, the term of this patent is extended or adjusted under 35 U.S.C. 154(b) by 54 days.

(21) Appl. No.: 17/050,078

(22) PCT Filed: Apr. 12, 2019

(86) PCT No.: PCT/EP2019/059529
§ 371 (c)(1),
(2) Date: Oct. 23, 2020

(87) PCT Pub. No.: WO2019/206688
PCT Pub. Date: Oct. 31, 2019

(65) Prior Publication Data
US 2021/0081978 A1 Mar. 18, 2021

(30) Foreign Application Priority Data
Apr. 25, 2018 (DE) .......................... 102018206390.7

(51) Int. Cl.
*G06Q 30/02* (2012.01)
*G06F 16/182* (2019.01)
(Continued)

(52) U.S. Cl.
CPC ....... *G06Q 30/0206* (2013.01); *G06F 16/182* (2019.01); *G06Q 30/0283* (2013.01); *H04W 4/02* (2013.01)

(58) Field of Classification Search
None
See application file for complete search history.

(56) References Cited

U.S. PATENT DOCUMENTS

2003/0126008 A1* 7/2003 Okuyama .......... G06Q 30/0206
  705/7.35
2006/0161504 A1* 7/2006 Walser .................. G06Q 10/06
  705/400
(Continued)

FOREIGN PATENT DOCUMENTS

JP 2019121333 A * 7/2019 ........... G06F 3/0635

OTHER PUBLICATIONS

Sun et al. "Improving bandwidth utilization by compressing small-payload traffic for vehicular networks" (2019) (https://journals.sagepub.com/doi/pdf/10.1177/1550147719843050) (Year: 2019).*

(Continued)

*Primary Examiner* — Sujay Koneru
(74) *Attorney, Agent, or Firm* — Gregory D. DeGrazia; Miller, Canfield Paddock & Stone

(57) ABSTRACT

The invention describes a distributed merchandise management system, in which the client, retailer and the manufacturer are linked by a network. This is implemented by a cloud storage (105), the cloud storage (105) comprising a means (105a) for storing data, a means for receiving first data from a first network node (110), the first data being associated with a physical object, a means for receiving request data from a second network node (120), a means for receiving second data from a third network node (130), the second data being associated with the first data and comprising at least one data piece adapted to change the first data depending on the received request data, a means for changing the first data based at least in part on the second data and the request data, and a means for sending a changed portion of the first data from the cloud storage (105) to the first network node (110).

5 Claims, 6 Drawing Sheets

(51) Int. Cl.
*H04W 4/02* (2018.01)
*G06Q 30/0201* (2023.01)
*G06Q 30/0283* (2023.01)

(56) References Cited

U.S. PATENT DOCUMENTS

| | | | |
|---|---|---|---|
| 2006/0282324 A1* | 12/2006 | Mori | G06Q 30/0207 |
| | | | 705/14.1 |
| 2012/0054049 A1* | 3/2012 | Hayes | G06Q 20/203 |
| | | | 705/302 |
| 2012/0109770 A1* | 5/2012 | Seergy | G06Q 30/0627 |
| | | | 705/26.2 |
| 2014/0022328 A1* | 1/2014 | Gechter | G06Q 30/06 |
| | | | 348/14.02 |
| 2014/0052700 A1* | 2/2014 | VanderSpek | G06F 16/1744 |
| | | | 707/693 |
| 2015/0288737 A1* | 10/2015 | Lee | H04L 65/80 |
| | | | 709/231 |
| 2016/0191158 A1* | 6/2016 | Aoyama | H04B 10/54 |
| | | | 398/172 |
| 2016/0260107 A1* | 9/2016 | Seth | G06Q 30/0201 |
| 2016/0267570 A1* | 9/2016 | Hodges | G06Q 30/0627 |
| 2018/0075380 A1* | 3/2018 | Perl | G06Q 50/30 |

OTHER PUBLICATIONS

First Office Action issued by the German Patent Office for the parallel German Patent Application DE 102018206390.7.

\* cited by examiner

DISTRIBUTED MERCHANDISE MANAGEMENT SYSTEM

PRIOR APPLICATIONS

The present application claims priority as a National Application to International Application No. PCT/EP2019/059529 filed on Apr. 12, 2019 that claims priority to German Patent Application No. 10 2018 206 390.7 filed on Apr. 25, 2018, the contents each of which are included herein by reference.

TECHNICAL FIELD

The invention concerns a distributed merchandise management system, in particular a cloud-based merchandise management system.

BACKGROUND

Where in the past goods were only distributed via the stationary sales channel, i.e. sold, for example, to customers by retailers in stores, there is now a plurality of different sales channels. The term sales channel is used to describe the path or flow of goods between manufacturer and customer. In particular, goods can be products that can also be described as physical objects.

Goods can, for example, take the direct path between manufacturer and customer, or they can be delivered to distributors so that the goods are either delivered directly from them to the customer or to a retailer who in turn sells the goods to the customer. Nowadays, the sale of goods via the Internet is becoming more and more important and is increasingly displacing regular stationary trade, especially because online trade allows manufacturers and distributors to contact customers directly and sell goods via this sales channel. Often the price also differs greatly between the online sales channel and the stationary sales channel, because the online sales channel, in contrast to the stationary sales channel, generally has lower self-cost and can react much faster to changing market conditions and adjust prices accordingly.

Thus, a heterogeneous sales channel situation prevails today. This confronts retailers, but also manufacturers, with the problem of how to adapt their merchandise management systems to the customer's behavior, i.e. to from which channel the customer is serving himself Within a merchandise management system, all changes in quantity and value of a flow of goods are recorded. Thereby, the goods themselves are mapped within the systems, for example, with general product identifications or with unique product identifications. For example, general product identifications map the goods on the product type level by means of a general EAN number, whereas unique product identifications map individual goods on the product level by means of an EAN number and at least one additional identification, such as serial numbers. This means that either types of goods or individual goods can be mapped in the merchandise management systems.

The heterogeneous sales channel situation confronts especially traders not organized in a trading network, i.e. traders who do not operate with a superordinate merchandise management system, with the problem of monitoring and mapping their flow of goods both stationary and online. Thereby, not only the fast fluctuating quantities have to be mapped, but also the price fluctuations have to be displayed almost in real time. This is currently not feasible, especially for stationary retailers, with the existing merchandise management systems and their technical possibilities. Known merchandise management systems are not able to keep up with the dynamic real-time price and availability information; this is especially true for the stock of goods of stationary retailers. Making this information available to customers is, however, an essential prerequisite for remaining competitive and attractive for customers, because price erosion is occurring precisely because of the ever-increasing and rapidly growing number of products available on the Internet. If the stationary sales channel does thereby not adapt to the online sales channel, for example, if the stationary price is not adapted to the online price or if the customer cannot see in advance whether a product is available, the stationary sales channel becomes less and less important.

However, the heterogeneous sales channel situation also confronts manufacturers with the problem that flows of goods are no longer easily comprehensible and can no longer be mapped in the merchandise management systems. If goods were previously sent from the manufacturer to the stationary retailer and sold there, possibly still with the interposition of authorized distributors, entire flows of goods become obsolete with the ever-increasing online sales channel, because distributors, for example, receive customer orders directly via the Internet and send the goods directly to the customer in the name and on account of the manufacturer. In these cases, the flow that the goods traversed from the manufacturer to the customer is no longer easy for the manufacturer to understand, i.e. the manufacturer does not know via which sales channel the customer ultimately received the product. Furthermore, with the advent of online trade, one sales channel has expanded through better price transparency, namely the so-called grey market. Here, surplus goods are often purchased from unauthorized distributors from national and international retailers at a favorable price, wherein the favorable purchase price is achieved, for example, by taking into account discounts and bonuses of the manufacturers, which were not originally intended for the purpose of lowering the purchase price, but rather for advertising measures, product placement, etc. These unauthorized distributors then deliver to retailers at a lower price than authorized distributors do. Since the heterogeneous sales channel situation has become unmanageable for manufacturers, they increasingly carry out test purchases or encourage customers to register purchased products in order to make the flow of goods comprehensible.

The heterogeneous sales channel situation also confronts customers with the problem that they can no longer easily find out where they can obtain goods at the most favorable price or, taking into account additional services (consulting, assembly, etc.), where they can obtain them at the lowest price or where goods are still available in a stationary form or at what price they are then offered in a stationary form. Even if availability inquiries are possible, the stationary price is usually worse than a price offered on the Internet or it is costly, and it takes a long time until a request is answered. This leads either to the fact that customers order the merchandise directly on-line or look at the merchandise only stationary, but at the end buy on-line.

This means that merchandise management systems are needed that can map the new heterogeneous sales channel situation.

An example of such a merchandise management system by absolute tracking of goods is shown in US 2012/0054049 A1. Here, the goods are already provided with a unique product identification during the production process, for example with a unique serial number, and this unique product identification is stored in a database of a central server. All changes in the location before the goods are sold are sent by logistics companies scanning the product identification to the central server, which assigns the location change in the database to the corresponding unique product identifications. If the product is sold to the customer, this information is also sent to the central server, either by the stationary retailer or by the online retailers, wherein the price of the sold goods can also be sent to the central server. In this case, it is therefore a central, closed merchandise management system that displays the flow of goods in a totalitarian and proprietary manner on a central server.

However, the merchandise management system described in US 2012/0054049 A1 has the disadvantage that large amounts of data are sent, which are stored centrally. Furthermore, this merchandise management system has the disadvantage that a large number of actors, such as manufacturers, retailers, customers and logistics companies, not only have to have access to the same central merchandise management system, but also have to adapt their own systems to it. Furthermore, such a system also raises the problem of data sovereignty. Furthermore, the described merchandise management system provides for a comprehensive traceability of the flow of goods, but no interaction between manufacturers, retailers and customers to specifically influence the flow of goods.

SUMMARY

Therefore, the task is to provide a distributed merchandise management system that does not have the disadvantages of the known merchandise management systems and allows manufacturers, retailers and customers to interact easily, but at the same time guarantees the data sovereignty of the individual actors. This means that each actor can control the access to his own data in a targeted manner.

This task is solved by the features of the independent claims, wherein the dependent claims represent preferred embodiments of the claimed features.

The task is solved a method according to the invention for operating a cloud storage, which can also be called merchandise management system storage. Thereby, the cloud storage can be a storage which is located on a central server or which is distributed over several servers. The storage can also be a redundant storage, i.e. the same content of the storage can not only be available on one server, but can also be available on at least one additional server. A server is to be regarded as any device which has at least one interface to at least one network and which has at least one memory. The at least one network can be any network over which data can be exchanged, for example the Internet. According to the invention, the cloud storage is in selective communication with at least a first network node, a second network node and a third network node. Selective communication in this case means that the cloud storage does not constantly have a connection with the respective network nodes, but only establishes a connection with them when data is to be exchanged. The network nodes can be devices that have an interface to at least one network. The network nodes can be designed differently and can have access to different networks. The networks must only allow communication with the cloud storage. Thereby, the first network node can be a device that is hosted at a retailer, for example a computer, tablet or point-of-sale, POS, system that has an interface that allows access to at least one network, e.g. the Internet. Thereby, the functionality of the first network node does not have to be fully implemented on the device hosted at the retailer, but can also be implemented in cloud storage. In this case, the first network node only needs to provide access to the corresponding implemented functionality. It is also possible that the second network node is not hosted at the retailer but at a distributor, or that the same functionality as at the retailer is implemented at the distributor, especially if the distributor also sells directly to customers without the intervention of a retailer. The second network node can be a device hosted at a customer, for example a computer, tablet or smartphone, which has an interface that allows access to at least one network, e.g. the Internet. Thereby, the functionality of the second network node does not have to be fully implemented on the device hosted at the customer, but can also be implemented in the cloud storage. In this case, the second network node only needs to provide access to the corresponding implemented functionality. The third network node can be a device that is hosted at a manufacturer, for example a computer or server that has an interface that allows access to at least one network, e.g. the Internet. Thereby, the functionality of the third network node does not have to be fully implemented on the device that is hosted at the manufacturer, but can also be implemented in the cloud storage. In this case, the third network node only needs to provide access to the corresponding implemented functionality. It is also possible that the third network node is not hosted at the manufacturer but at a distributor, or that the same functionality as that at the manufacturer is implemented at the distributor.

The method according to the invention comprises the steps of receiving first data from the first network node at the cloud storage, wherein the first data is associated with a physical object. The physical object can be, for example, a merchandise or product that is present at the location of the first network node. For example, the first network node may have an input unit that can be used to enter the first data concerning the physical object. This can be done using a keyboard or a scanner. Thereby, the first data can comprise for example the data characteristic of a merchandise management system, such as for example the quantity and price of a physical object. The first data can then be stored in cloud storage, for example in a portion of the cloud storage belonging to the first network node. The first data itself can be localized by an identification associated with the physical object, which is also stored on the cloud storage. For example, the product identification of a physical object or a physical object type can be stored on the cloud storage and the received first data can be assigned to this product identification. Thereby, a product identification can be designed in such a way that it is a unique product identification, i.e. the product identification identifies exactly one single physical object. The product identification can also be designed in such a way that the product identification identifies an object type, i.e. the product identification identifies a plurality of physical objects of the same type. Thereby, physical objects of the same type share at least one feature characterizing this type. Here, not only first data from a physical object can be received by a first network node at the cloud storage, but also a plurality of first data from a plurality of first network nodes concerning a plurality of physical objects. Thereby, it is also possible that the first data do not only concern a single physical object, but a plurality of physical objects or a plurality of physical object types.

In a further step, the method according to the invention comprises receiving request data sent from a second network node. This request data may relate to a specific physical object, a plurality of physical objects, a specific first network node and/or a specific subset of first network nodes. Thereby, the second network node may have an input unit that can be used to enter the request data. Here, too, request data can be received not only by a second network node at the cloud storage, but also from a large number of second network nodes. The request data can either be received directly from the second network node at the cloud storage or can be forwarded to the cloud storage, i.e. received indirectly.

In a further step, the method according to the invention comprises receiving second data from a third network node, wherein the second data is associated with the first data and comprises at least one data piece adapted to change the first data based at least in part on the received request data. For example, the second data may include data characteristic of a merchandise management system, such as a price of a single physical object or of a type of physical object. For example, the cloud storage can inform the third network node about the request data, or the cloud storage can, for example, make this data available to the third network node, i.e. either send it to the third network node or make it available for retrieval. It is also conceivable that the cloud storage can provide the third network node with statistics regarding the request data. For this purpose, the cloud storage can comprise the step of processing the request data. Using the request data or the processed request data, the third network node can determine how much interest there is in a physical object or in a type of physical object and can adjust the price accordingly. However, it is also conceivable that the absence of request data indicates a change in the first data and second data is generated accordingly. It is also conceivable, however, that due to the current stock situation at the manufacturer, the manufacturer adjusts the price in order to increase the flow of goods in order to regain storage capacity. It is also conceivable that the price is adjusted due to the acquisition of new customers or to promote a special physical object. However, the person skilled in the art is aware that there will be other situations and external constraints that will lead the third network node to change the first data in order to control the flow of goods in a targeted manner.

According to the invention, the cloud storage can then change the first data based at least in part on the second data and the request data. This changing can consist of changing the first data, for example the price of the physical object based on the new price, received from the third network node. In other words, after the change, the first data in the cloud storage, which can be found for example through the product identification, is changed.

The method according to the invention further comprises the step of sending the changed portion of the first data to the first network node. This means that the first network node receives delta data to its first data in order to adjust its own first data. Delta data means that this data is smaller than the original data. For example, the bit number to represent the changed portion of the first data is smaller than the bit number to represent the original first data. The term delta data refers to the storage or to transmission of data changes instead of the entire data. In order to store and to transmit delta data, the symmetric or the direct delta variant can be used. With the symmetric variant, all necessary modifications between two different versions of the data are stored and transmitted. The direct delta variant stores and transfers the change operators that are necessary to turn one version of the data into the other version of the data. For example, in the first case (symmetrical variant) the first network node receives a new price for a physical object, in the second case (direct variant) a change price or a percentage by which the price of the physical object can be reduced. Sending only a portion of the data has the advantage that less redundant data must be kept. Furthermore, there is a reduced amount of data transmission and thus savings in transmission bandwidth, which is especially advantageous for the mobile application case for the second network node, but also for reduced bandwidths of the first network node.

For the first time, the method according to the invention enables retailers, manufacturers and customers to interact with each other without the need for large amounts of data or the implementation of complex interfaces. This interaction enables not only the traceability of the flows of goods, but also their targeted control.

In a preferred embodiment of the method according to the invention, the method further comprises receiving an object description at the cloud storage. The object description can be received by the third network node or by another device. For example, the manufacturer can send a description of a physical object or of a plurality of physical objects to the cloud storage. This object description can then be retrieved by the first network node, for example, to be used for its offers and descriptions of the physical objects. In other words, this description can, for example, provide the technical specifications of the physical object or other data relating to the physical object. In the cloud storage, the object description can be linked for example to the product identification of the physical object.

In a preferred embodiment of the method according to the invention, the request data received from the second network node comprise data directed to a specific physical object. Furthermore, the request data may also comprise position data of the second network node. The data directed to the physical object can for example request its availability. The position data can either be provided by a position determination unit at the second network node or can originate from an input. The position data can show the current or predicted position of the second network node. For example, the availability and price of a physical object can be requested at a location where the second network node is located or will be located. For the predicted position, for example, motion profile data or other data can be used that provide information about the future position of the second network node. The request data can also comprise other data that can be used to complete a request.

In a preferred embodiment of the method according to the invention, the method further comprises sending first changed data to the second network node. Thus, the cloud storage can therefore also be adapted to inform the second network node of changed first data. This can be advantageous, for example, if it is recognized that the connection between the cloud storage and the second network node can make the corresponding data available to the second network node faster than the connection through the first network node.

The above-mentioned task is also solved by cloud storage, wherein the cloud storage is in selective communication with at least a first network node, a second network node and a third network node. The cloud storage according to the invention comprises a means for storing data, a means for receiving first data from the first network node, wherein the first data is associated with a physical object, a means for receiving request data from the second network node, a means for receiving second data from the third network node, wherein the second data is associated with the first data and comprises at least one data piece adapted to change the first data depending on the received request data, a means for changing the first data based at least in part on the second data and the request data, and a means for sending a changed portion of the first data from the cloud storage to the first network node. The cloud storage can be a dataspace, supported by a data space support platform, which takes care of uniform data usage and the provision of simple services, such as searching and changing the data. In addition, individual logical components can be used to describe the data sources and data sinks, here the network nodes, and their relationship within the data space. The cloud storage can be a service based on the platforms of IBM Bluemix, Microsoft Azure or Google App Engine. The cloud storage can also be a database based on MongoDB with a web server based on Node/Express.

The above-mentioned task is also solved by a method for operating a first network node, the method comprising determining first data associated with at least one physical object. Thereby, the determining can be accomplished by scanning a product identification of the physical object. For example, the product identification can be an electronically scannable mark, such as a barcode, a QR code, an RFID tag or any other mark that provides information about the product identification. However, the first data can also be entered manually, for example using a keyboard. The person skilled in the art is aware, however, that there may also be other ways of determining the first data than those mentioned above at the first network node or may be part of the first network node. For example, the first network node may have an interface to interact with an already existing merchandise management system and determine data regarding physical objects from it. For example, the first data can contain data characteristic of a merchandise management system, such as the quantity and price of a physical object. The person skilled in the art is aware that the step of determining can also include the determining of first data for a plurality of physical objects. Thereby, the single physical object or the plurality of physical objects may be present, for example, at the location of the first network node.

The method according to the invention further comprises sending the first data to a cloud storage. Thereby, the sending can take place over a network that is in communication with the first network node and the cloud storage. For this purpose, the first network node can, for example, have at least one interface with which the first network node can be connected to the network, for example the Internet.

The method according to the invention also comprises the receiving of a changed portion of the first data from the cloud storage. The changed portion of the first data is smaller than the first data. That is, the number of bits of the changed portion of the first data is less than the sent first data. The changed portion can contain delta data or be completely based on delta data.

The method according to the invention further comprises the linking of the changed portion of the first data to the determined first data. Thereby, the first data is changed with the help of the received changed portion of the first data. For example, the changed portion of the first data may affect the price of the physical object, and the first network node can adjust it according to the changed portion of the first data.

In a preferred embodiment of the method according to the invention, determining the first data further comprises retrieving first data from the cloud storage and completing the retrieved first data. For example, the first data may include a general object description, such as the technical characteristics of a physical object. This object description can also contain a product identification. The first network node can retrieve this object description from the cloud storage and store it, i.e. download it, and complement it with additional information, for example the existing quantity and price, to obtain complete first data. This has the advantage that the first network node does not have to generate an object description himself, but can download a centrally stored and above all updated object description into his part of the merchandise management system and complete it with his own information. The person skilled in the art is aware that when the first network node sends first data to the cloud storage, only the completed parts of the first data are sent, rather than the already downloaded parts of the first data. This has the advantage that only a low bandwidth is required. Likewise, the first network node can also retrieve only a portion of the first data from the cloud storage if portions are already stored.

In another preferred embodiment of the method according to the invention, the method comprises receiving request data from a second network node and sending the request data to the cloud storage. The request data may, for example, concern a specific physical object or a type of physical object and/or a specific first network node or a plurality of first network nodes. In this case, the first network node acts as a relay for the request data of the second network node. This means that the first network node receives the request data from the second network node and forwards it without processing to the cloud storage.

The above-mentioned task is also solved by a method of operating a second network node, the method comprising sending request data to a cloud storage or to a first network node, wherein the request data is associated with at least one physical object and/or at least one first network node. The request data may, for example, relate to a specific physical object or a type of physical object and/or a specific first network node or a plurality of first network nodes. For example, a second network node may send a request regarding the availability and price of a specific physical object. This request can either be sent to a first network node, i.e. its part of the merchandise management system, or to the cloud storage. This request is also sent via the cloud storage to the third network node, which is able to change the first data associated with the physical object based on the request situation. This means that if a second network node, for example a customer, makes a price request, this price request can not only be made available to the first network node, for example the retailer, but it is also made available to the third network node, for example the manufacturer, who can change the price in real time depending on the request situation, namely by sending second data associated with the physical object to the cloud storage. The second network node then receives first data, according to the invention, wherein the first data is based on the request data and on second data from a third network node. This means, for example, that the price request is answered with a changed price, wherein the price was changed by the third network node.

In a further preferred embodiment of the method according to the invention, the method further comprises generating of an identification object with the received first data and identification data. The identification data can, for example, identify the second network node and/or the physical object that was requested with the first data identifying the physical object. The identification object can be used, for example, to verify an online request of a physical object by the second network node as well as the received first data of the physical object against the first network node. The identification object can be a QR code which contains the corresponding data. For example, a second network node, such as a customer, can send a price request for a specific physical object to the cloud storage and receives in response a price of the requested physical object that has been changed by the interaction of the cloud storage with the third network node, such as the manufacturer. To verify the request and in particular the received price, the identification object can be generated. If this is then transferred from the second network node to the first network node or scanned by the first network node, the latter can verify the price request and the changed price with the cloud storage. However, the identification objects can also be stored on the cloud storage in the sense of a block chain, i.e. unchangeable, and the first network node and the second network node can check by entering the block chain whether the request of the second network node resulted in a change of the first data or not. This protects the first and third network nodes against fraud attempts by an unauthorized second network node.

The above-mentioned task is also solved by a method of operating a third network node, the method comprising generating second data, wherein the second data is adapted to change first data depending on request data, and sending the second data to a cloud storage.

In a preferred embodiment of the method according to the invention, the method further comprises receiving the first data and request data from the cloud storage, and wherein the generating the second data is based on the first data and the request data. The absence of request data, as indicated by the receipt of empty or zero data (void data or null data), for example, can also serve to generate the second data. For example, the empty or zero data can be generated if the request data for a certain physical object is missing for a certain time. For example, the absence of request data can mean a lack of demand for a physical object. To still control the flow of goods, the price can be adjusted, and the adjustment can be sent to the cloud storage in the form of second data. The second data can be delta data.

In a preferred embodiment of the method according to the invention, the method further comprises generating an object description of an object and sending the object description to the cloud storage. The object description can, for example, contain the product identification of a physical object. Furthermore, the object description can contain the technical data of a physical object.

The above-mentioned task is also solved by a distributed merchandise management system, comprising a cloud storage, a first network node, a second network node and a third network node. The cloud storage is in selective communication with the first network node, the second network node and the third network node. The cloud storage thereby provides an indirect connection between the respective network nodes. In the distributed merchandise management system, first data being associated with a physical object sent by a first network node is stored in the cloud storage. This first data can then be changed, updated or modified by the first network node. The first network node can also define who and to what extent has access to the stored first data.

The second network node can request these stored first data with a request to the cloud storage. Before the request from a second network node is answered, the request is sent from the cloud storage to the third network node. The third network node can generate second data based on the request data and send it to the cloud storage. These second data are able to change the first data in the cloud storage. For example, the second data is adapted to change the price of a physical object. The request of the second network node can then be answered with the changed first data.

Even if in the above explanations the price is used as an example of a data record of a physical object to be changed, it is clear to the person skilled in the art that this was only given as an example for better understanding, but that any data records of the physical object can be changed by the subject of the invention; in particular the data records which are specified by a manufacturer and which are of equal interest to retailers and customers.

Further details and advantageous embodiments of the invention are given in the following description and the Figures, on the basis of which the embodiment of the invention shown in the Figures is described and explained in more detail.

DETAILED DESCRIPTION

Figure 1:
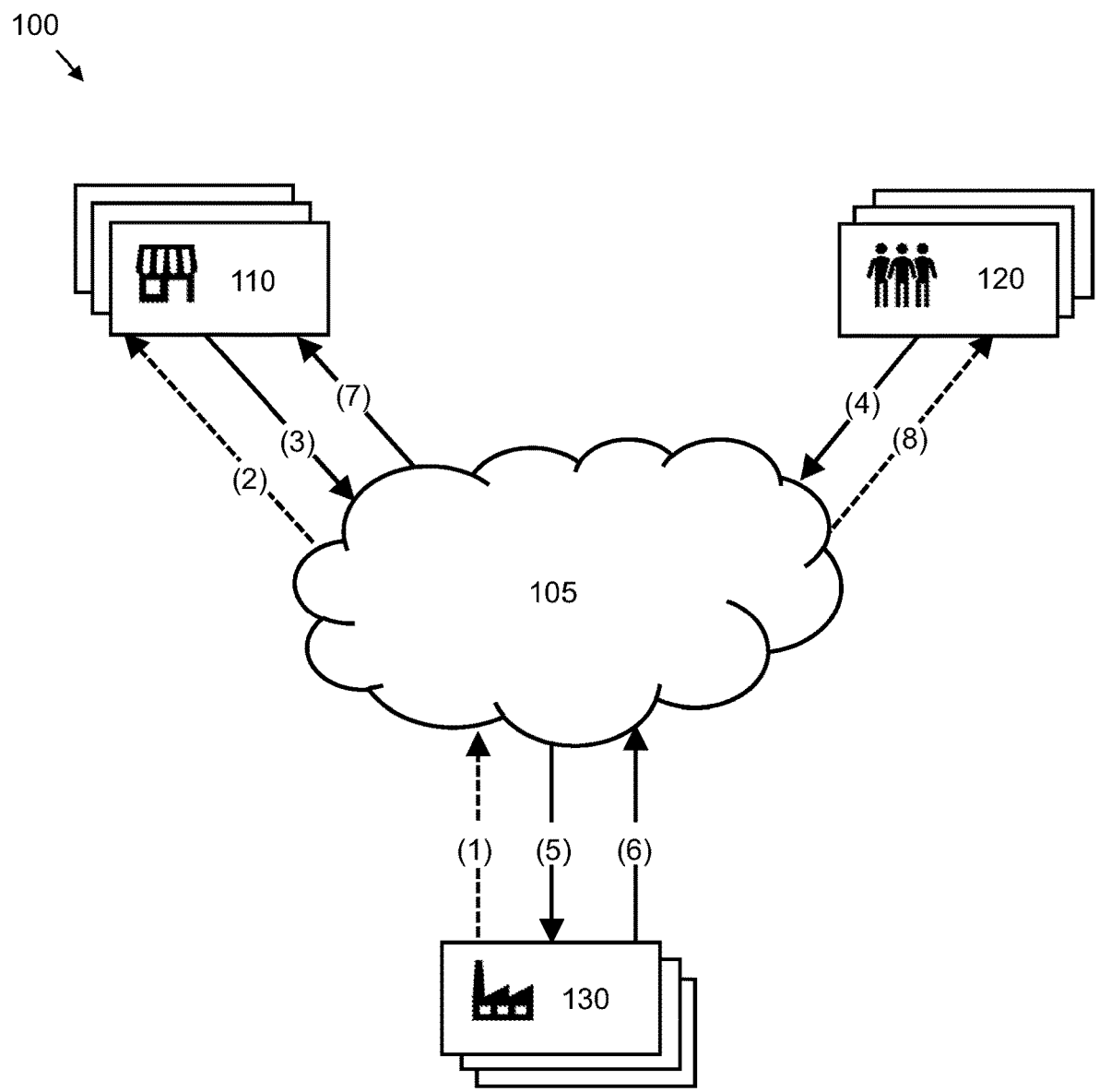
FIG. 1 shows a data flow within an embodiment example of the distributed merchandise management system according to the invention with a cloud storage.

FIG. 1 shows a data flow within an embodiment example between a cloud storage 105 and three network nodes 110, 120, 130. Together, the cloud storage 105 and the network nodes 110, 120, 130 form an embodiment example of a distributed merchandise management system.

The cloud storage 105 can be any storage, for example a database system of a server system. For example, a database system that is intended as an in-memory solution to meet real-time requirements. For example, an SAP HANA system can be used as a corresponding MEMSQL system. However, the person skilled in the art is aware that any database system can be used, which is selected according to the requirements of the real-time processes. Real-time means that the data flows, evaluations and the passing on of data have the least possible latency.

Thereby, the cloud storage 105 is adapted to receive and send data, for example via a network. For example, the server system on which the database of the cloud storage 105 is stored can have access to the Internet. The person skilled in the art is aware that if we are talking about a cloud-based solution here, it can also be located on several networked server systems.

By connecting the cloud storage 105 to a network, it can enter into selective communication with several network nodes 110, 120, 130. Selective in this case means that there are not necessarily proprietary connections between the network nodes 110, 120 and 130, but these connections can be established and closed as required.

The network nodes 110, 120 and 130 shown in the embodiment example shown here are computers or other devices that have at least one interface to communicate with the cloud storage 105. The network nodes 110, 120 and 130 can be physically separated from the cloud storage 105, for example, a first network node 110 can be at a retailer's site, a second network node 120 can be at a customer's site and a third network node 130 can be at a manufacturer's site. The person skilled in the art is aware that due to this different hosting, the network nodes 110, 120 and 130 can also be configured differently. For example, the first network node 110 can be a computer of a POS system that is hosted at the retailer, the second network node 120 can be a tablet or smartphone that is operated by a customer, and the third network node 130 can be a computer of a manufacturer's system. In addition, the function of the individual network nodes 110, 120 and 130 themselves can also be implemented on other devices, e.g. servers—not shown here—wherein the devices available at the location of the respective users— retailer, customer, manufacturer—only provide access to these servers. It is also conceivable that the functionality of the individual network nodes 110, 120 and 130 is implemented on the cloud storage 105 and that devices available at the location of the respective users—retailer, customer, manufacturer—only provide access to the cloud storage 105.

In the distributed merchandise management system according to the invention, data is exchanged between the network nodes 110, 120 and 130 and the cloud storage 105. In the embodiment example shown here, in the optional step (1), an object description of a physical object is first sent from a third network node 130 to the cloud storage 105 and stored there. This object description comprises, for example, a unique identification of a physical object or its object type, such as an EAN number, a serial number, etc. The object description can also contain additional data of the physical object that describes the physical object, such as its recommended retail price, list price, its technical specifications, images of the physical object, etc. This additional data can be stored in the cloud storage 105 based on the unique identification of the physical object or its object type.

In a further optional step (2), a first network node 110 can download the object descriptions or at least parts of the object description. For example, the first network node 110 can use the data contained in the object description to create an offer, catalogues, etc. This has the advantage that the data describing the physical object, which is constantly kept up-to-date by the manufacturer, does not have to be stored redundantly at the retailer, but the retailer can use the object description from the cloud storage 105. This means that there is already a substantial saving in hardware requirements and update requirements for the retailer's merchandise management system.

In a further step (3), the first network node 110 sends to the cloud storage 105 first data being associated with a physical object determined by the first network node 110. For example, the first data can be the quantity of physical objects present at the first network node 110, wherein the quantity can be broken down by the respective physical objects or their type. This first data can either be acquired by scanning the physical objects themselves, for example by scanning the barcode of the physical objects, or by reading a QR code, or it can be obtained from a merchandise management system already present at the first network node 110. This first data is then received at cloud storage 105 and stored according to the unique identification of the first network node 110. The person skilled in the art is aware that the first data can be stored not only according to the first network node 110, but also according to the unique identification of the physical object. After this step, for example, the quantities of individual physical objects at the first network nodes 110 are known in the cloud storage 105.

In a further step (4), request data can be sent to the cloud storage 105 by a second network node 120. Even if in the embodiment example shown here the request data is sent directly from the second network node 120 to the cloud storage 105, the person skilled in the art is aware that this data can also be sent to the cloud storage 105 by connecting additional devices. It is also conceivable, for example, that the second network node 120 sends the request data to the first network node 110 or the third network node 130, and they send the request data to the cloud storage 105. The request data can contain requests for one or more physical objects. For this purpose, the request data can contain search parameters. For example, the request data can request the availability of a physical object from a first network node. The person skilled in the art is aware that the request data may contain any data that can request any information regarding a physical object. The request data may also contain information regarding a specific first network node 110, for example, a request for a specific physical object from a specific first network node 110, or information regarding the location of the second network node 120, either the current or the predicted location and a proximity parameter for requesting the physical object according to the search parameters.

However, the cloud storage 105 does not answer these requests immediately, as is known from normal availability requests, but in a further step (5) the cloud storage 105 sends the request data or portion of the search parameters contained therein to the third network node 130. The person skilled in the art is aware that the cloud storage 105 can render the requests anonymous in such a way that the identity of the second network node 120 remains hidden to the third network node 130. For example, only a portion of the request data can be sent to the third network node 130. For example, only the information that there was a request concerning a physical object, and maybe additionally information about where the request was made or about the location of the availability request. The person skilled in the art is also aware that several request data by several second network nodes 120 can be sent cumulatively to the third network node 130. For example, that a certain physical object was requested with a certain frequency. Even if an availability request is described here for exemplary reasons, the person skilled in the art is aware that other data can also be requested, for example the price. The cloud storage 105 can also initially process the request data. For example, the cloud storage 105 can produce statistics regarding the request data and make them available to the third network node 130. In order to limit data transfers to a minimum, the cloud storage 105 can also receive limiting values for certain search parameters from the third network node 130, and only if these limiting values are exceeded or not reached the third network node 130 will be provided with the corresponding request data or the processed request data. For example, the third network node 130 can inform the cloud storage 105 that it only wants to be informed in the event of a certain number of requests.

In a further step (6), the third network node 130 sends—if the third network node 130 is informed about this—second data to the cloud storage 105 based on the request data, wherein this second data is delta data and is able to change at least a portion of the first data of the physical object in the cloud storage 105 based on the request data. For example, a delta with respect to the price of the physical object is sent by the third network node 130. Thereby, the third network node 130 has, for example, become aware through the request data that there is an increased demand for the physical object and, based on this, can change the price of the physical object, its list price or other pricing arrangements, such as discounts, etc.

The change of the first data is made on the basis of the second data by the cloud storage 105. The cloud storage 105 then sends changed portions of the first data to the first network node 110 in step (7). For example, the cloud storage 105 sends the second delta data received from the third network node 130 to the first network node 110, or sends the already changed portion of the first data to the first network node 110. In this case, the first network node 110 can provide the physical object with the changed first data. The cloud storage 105 can also send to the first network node 110 an identification object that identifies a specific second network node 120 and the changed first data. This means that the changed first data is only made available or offered to the person who has sent the corresponding request data. When purchasing the physical object, the second network node 120 can then also authenticate itself to the first network node 110 with an identification object, i.e. it can prove that the request data on the basis of which the first data was changed originated from exactly this second network node 120. This identification object can be a QR code, for example. When the physical object is purchased, the identification object can then be received and compared at the first network node 110 with the identification object of the second network node 120. The identification objects can also be stored in the sense of a block chain on the cloud storage 105, so that the respective network nodes 110, 120, 130 can access the portion of the block chain that is important for them and thus, for example, verify the change of the first data.

In a further step (8), the cloud storage 105 sends the second network node 120 a response to its request data, namely in the form of the changed first data. For example, based on its availability request, the second network node 120 can then be shown not only the availability of the physical object, but also its price as changed by the third network node 130. The person skilled in the art is aware that this response to the request data, even if shown in the embodiment example shown here as being directly from the cloud storage 105 to the second network node 120, can also occur indirectly via other connections. The second network node 120 can create an identification object from the changed first data and its identification, which the second network node 120 can use to verify its request and the first data changed on the request to the first network node, i.e. to prove that this second network node 120 was provided with changed first data by the third network node 130 as a result of its request data. For example, if the third network node 130 has changed the price due to the request data of the second network node 120. The second network node 120 can send this identification object to the cloud storage 105, which in turn can send this identification object to the first network node 110, for example in step (7).

With such a distributed merchandise management system, in which there is not only interaction between retailer and customer, but also interaction between retailer, customer and manufacturer, the retailer is able to respond to requests in real time. This means that the stationary trade can react directly to online requests and can also maintain the online price or even undercut it in part through the connection to the manufacturer. The systems known today lack this component of the connection to the manufacturer.

Figure 2:
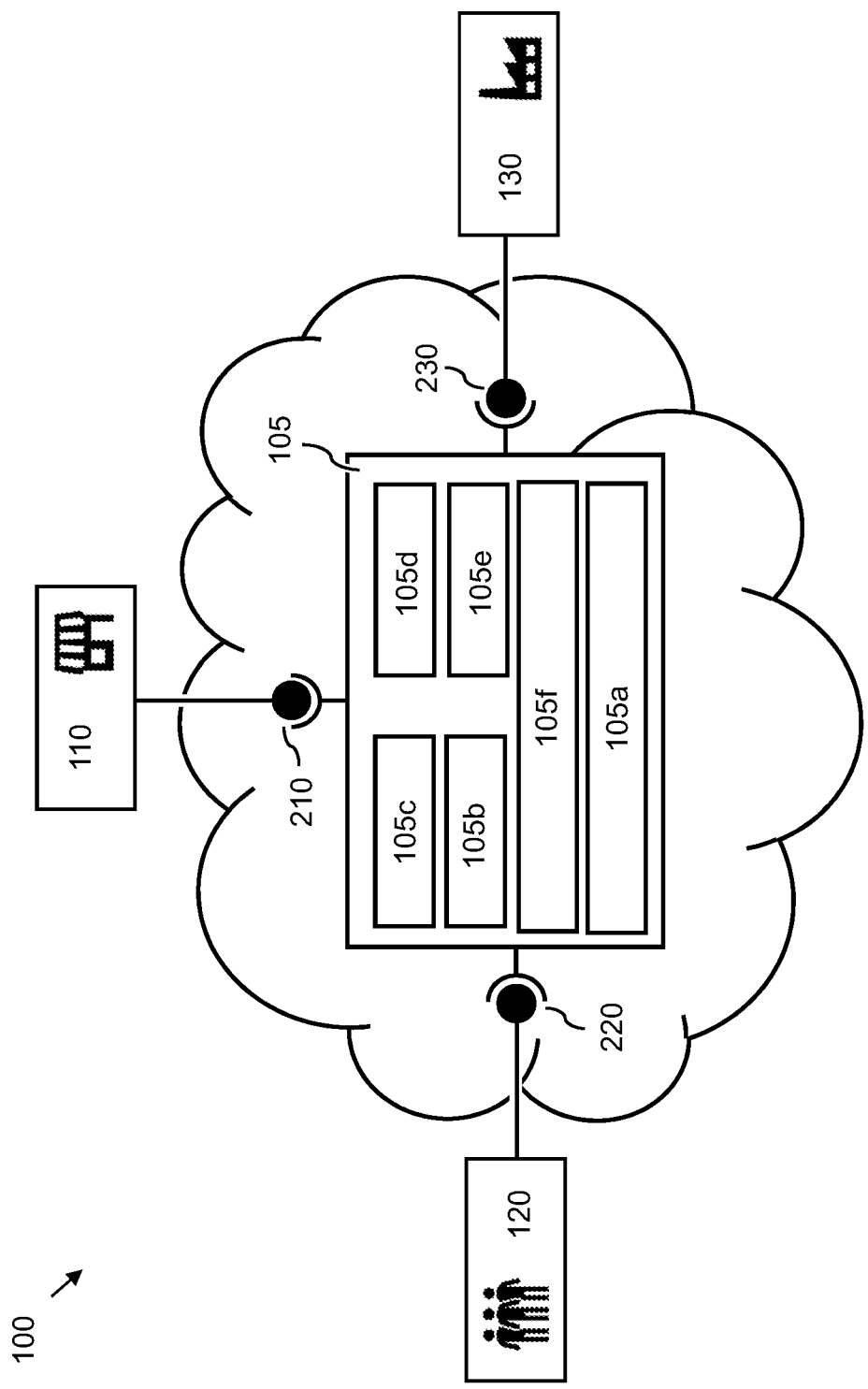
FIG. 2 shows an interface view of the distributed merchandise management system according to the invention with the cloud storage as shown in FIG. 1.

The connection from the cloud storage 105 to the individual network nodes 110, 120 and 130 can be realized through interfaces. This is shown in FIG. 2, where the cloud storage 105 has an interface 210 to the first network node 110, a second interface 220 to the second network node 120 and a third interface 230 to the third network node 130. These interfaces 210, 220 and 230 can be hardware or software interfaces. Accordingly, these interfaces can provide not only the connection in terms of hardware but also in terms of software in the form of corresponding modeling and error correction and, in particular, they can also handle the encryption of the transmitted data so that the data is protected against access by third parties.

The interfaces can be implemented as REST interfaces based on LoopBack, for example. OpenSSL can be used for the encryption of the interfaces. The encryption of the data flows between the cloud storage 105 and the network nodes 110, 120, 130 can also be implemented in hardware, for example using dongle and smart cards to implement a DES-DES or RSA-DES method, for example.

The cloud storage 105 itself has a storage 105a, in which the data of the physical objects are stored. Different memory areas of the storage 105a can be assigned to the individual first network nodes in order to enable data sovereignty. Furthermore, the cloud storage has the functional blocks 105b-f.

Block 105b provides the server-side functionality of an app, for example. The client-side functionality of the app is, for example, on the side of the first and second network nodes 110, 120. For example, the first network node 110 has client-side app functionality that allows the first network node 110 to determine or enter the first data of the physical object and send it to the cloud storage 105, wherein the server-side functionality of the app stores the corresponding data in storage 105a of the cloud storage 105. Also the second network node 120 can comprise client-side app functionality that can determine or enter request data and send it to the cloud storage 105. The server-side functionality of the app then processes the request data.

Block 105c, for example, represents the functionality of a broker and mediates the data between the respective network nodes 110, 120, 130. For this purpose, the broker provides a catalog in which data providers, i.e. the network nodes 110, 120, 130, report their interfaces and data users, i.e. also the network nodes 110, 120, 130, can find them. Furthermore, it also serves as a central point between the network nodes 110, 120, 130 to make agreements on data use. In other words, block 105c is responsible for arranging data access. It provides the functionality in which the first and third network nodes 110, 130 can register. These can now request a release of rights for the data to be switched, which must be confirmed by the other party to enable data access. This can be a token-based assignment of rights. With this type of authentication, the individual participants do not exchange any access passwords. Instead, tokens are assigned by a central authentication authority, which can then be used for a time-limited access to a resource. The open authentication protocol OAuth can be used here, for example.

Block 105d, for example, provides the functionality of a certificate authority that is used to verify the authenticity of individual network nodes 110, 120, 130, such that the cloud storage 105 is protected against access by unauthorized third parties or possible manipulation. In particular, it must be ensured that no unauthorized person pretends to be a third network node 130, for example, because the third network node is responsible for pricing. The certificate authority can also ensure that only verified object descriptions of authenticated third network nodes are uploaded. For example, when an object description is uploaded, it is ensured that the unique identification of the physical object also belongs to the third network node 130 who uploads it. For example, this can be checked by registering the EAN with a central office.

Block 105e, for example, provides the functionality of a product information service that is used to provide a comprehensive range of information on the physical objects and the stored object descriptions of the physical products.

Block 105f, for example, provides the functionality of a dynamic price and stock level adjustment. This block 105f is used, for example, to dynamically determine the price and stock levels of the physical objects. The price of a physical object can be set dynamically in various ways. For example, via the purchase price of physical objects for retailers in the standardized order method when a minimum order stock of a physical product is reached by the retailer. The manufacturer (or distributor) determines a price taking into account further conditions (e.g. bonuses, discounts). As soon as a product reaches a certain stock or order quantity at a retailer, block 105f changes the price for the corresponding retailer. The manufacturer can also inform the cloud storage 105 that its stock levels of a physical object are too high and the manufacturer wants to adjust the price of a physical object to reduce the stock levels. Block 105f can use this information, as well as information about where there is high demand for the physical object or where the stock levels at retailers are currently low, to adjust the price so that the manufacturer's stock level can be reduced. Block 105f can also be used by the manufacturer to provide an additive compensation, which is released to customers or retailers in appropriately defined parameters.

Figure 3:
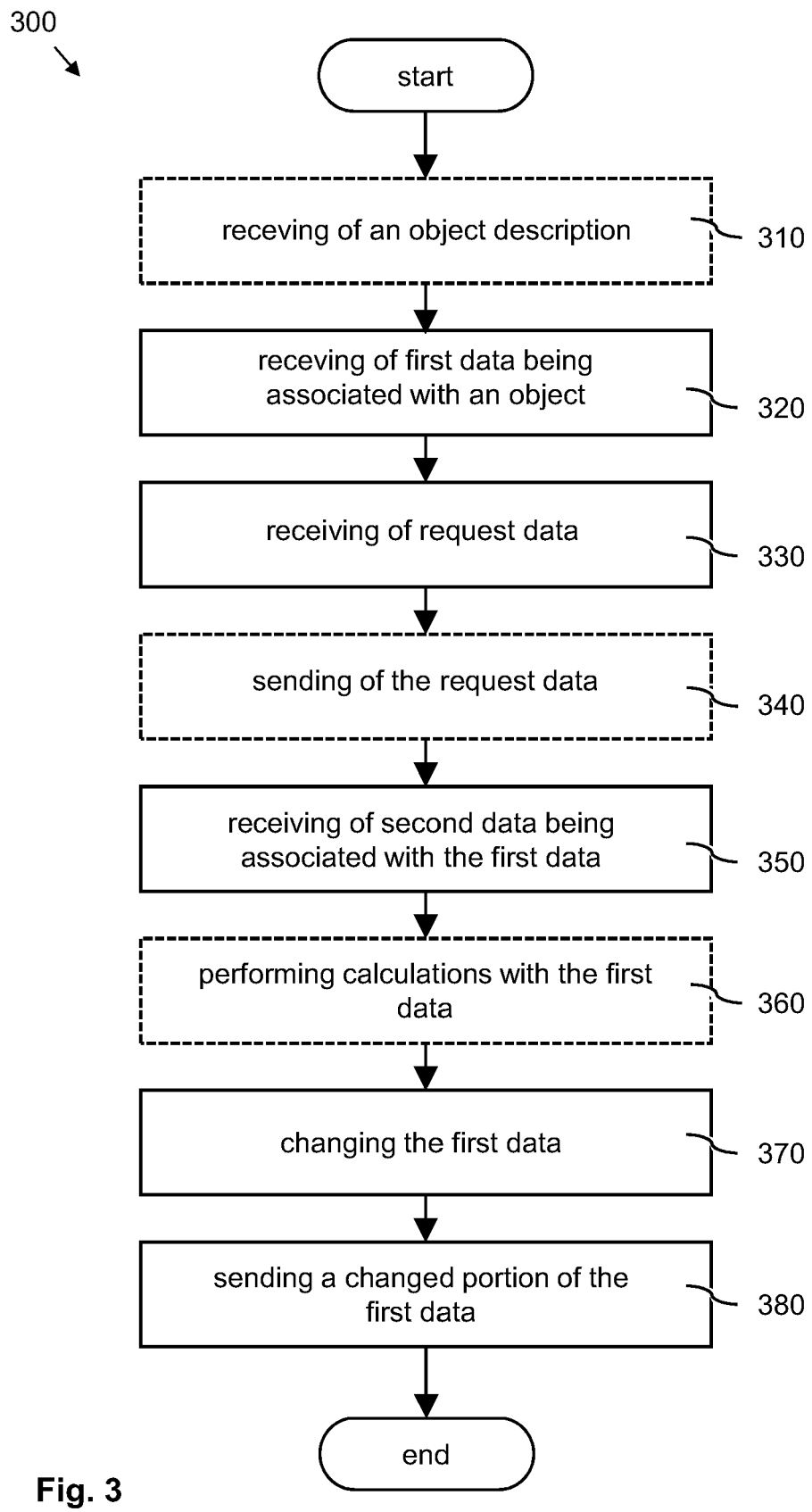
FIG. 3 show a flow diagram for operating the cloud storage of the distributed merchandise management system as shown in FIGS. 1 and 2.

FIG. 3 shows a flow diagram for operating the cloud storage 105 of the distributed merchandise management system according to the invention as shown in FIGS. 1 and 2. In an optional first step 310, an object description is received at the cloud storage 105. This object description can be received by a third network node 130 or by another network node, for example a data service. The object description itself can contain data related to a single physical object or to a type of physical object. A data service can be another network node which is responsible for making object descriptions available to the cloud storage 105 for third network nodes or for keeping them up to date.

In a further step 320, the cloud storage 105 receives first data from a first network node 110. This first data is associated with the object description and can be assigned to it within the cloud storage 105 by the cloud storage 105. For example, in step 320, the first network node 110 can send the quantity of a physical object in the form of first data to the cloud storage 105, wherein the quantity refers to a quantity of physical objects that are present at the first network node 110 or to which the first network node 110 has access. The first data can also include data that identifies the first network node 110. By repeating step 320, a mapping of the stock level at the first network node 110 is created in the cloud storage 105. The person skilled in the art is aware that if only one first network node 110 is mentioned in this embodiment example, there is a large number of first network nodes 110. If all these send their first data to the cloud storage 105, the stock level is mapped in this way over the plurality of first network nodes 110 and they thus constitute a part of the distributed merchandise management system according to the invention.

In a further step 330, the cloud storage 105 receives request data regarding physical objects mapped in the distributed merchandise management system. The request data can either originate directly from second network nodes 120 or the request data is only originally from second network nodes 120, but was received at the first network node 110 and forwarded to the cloud storage 105. The request data itself can contain data relating to the second network node 120 as well as data directed to a specific physical object. For example, the request data may include a price and/or availability request. The request data itself can have different search parameters.

In an optional step 340, the cloud storage 105 then sends the request data to a third network node 130. This third party can determine from the request data what demand there is for a specific physical object. Alternatively or additionally, the cloud storage 105 can also process the request data and make the result of the request data available to the third network node 130.

Based on this, the third network node 130 can adjust the price, discounts etc. associated with the physical objects according to the demand and this on a request-specific basis. I.e. if there is a high demand for a product in stationary trade on Saturday, the corresponding price of the product can be adjusted for the stationary trader. Also, the stock situation of physical objects can be taken into account, for example to increase the sales of a physical object. This constitutes another part of the distributed merchandise management system according to the invention. The third network node 130 generates second data based on the request data, which is able to change first data in the cloud storage 105. These second data are delta data of the first data. These second data are then sent by the third network node 130 to the cloud storage 105.

In step 350, the cloud storage 105 receives the second data. Optionally, calculations, statistical evaluations or similar can then be performed with the first data in one step. For example, the second data can specify that the first data should only be adjusted if a certain stock level is exceeded, a storage time has reached a certain limit value or other conditions are met. These conditions can be checked in step 360.

In step 370, the cloud storage 105 can then perform a changing of the first data based on the calculations performed in step 360 or without them based on the second data received in step 350. For example, the price of a physical object stored in the cloud storage 105 can be changed based on the manufacturer's specifications, wherein these specifications are adapted to the specific request.

Then, in step 380, the cloud storage 105 can send a portion of the changed first data, for example the changed price, in the form of delta data to the first network node 110. This enables the first network node 110 to demand the price for the physical object, which has been changed according to the manufacturer's specifications. This enables an adjustment of a stationary price based on request-specific manufacturer specifications.

Figure 4:
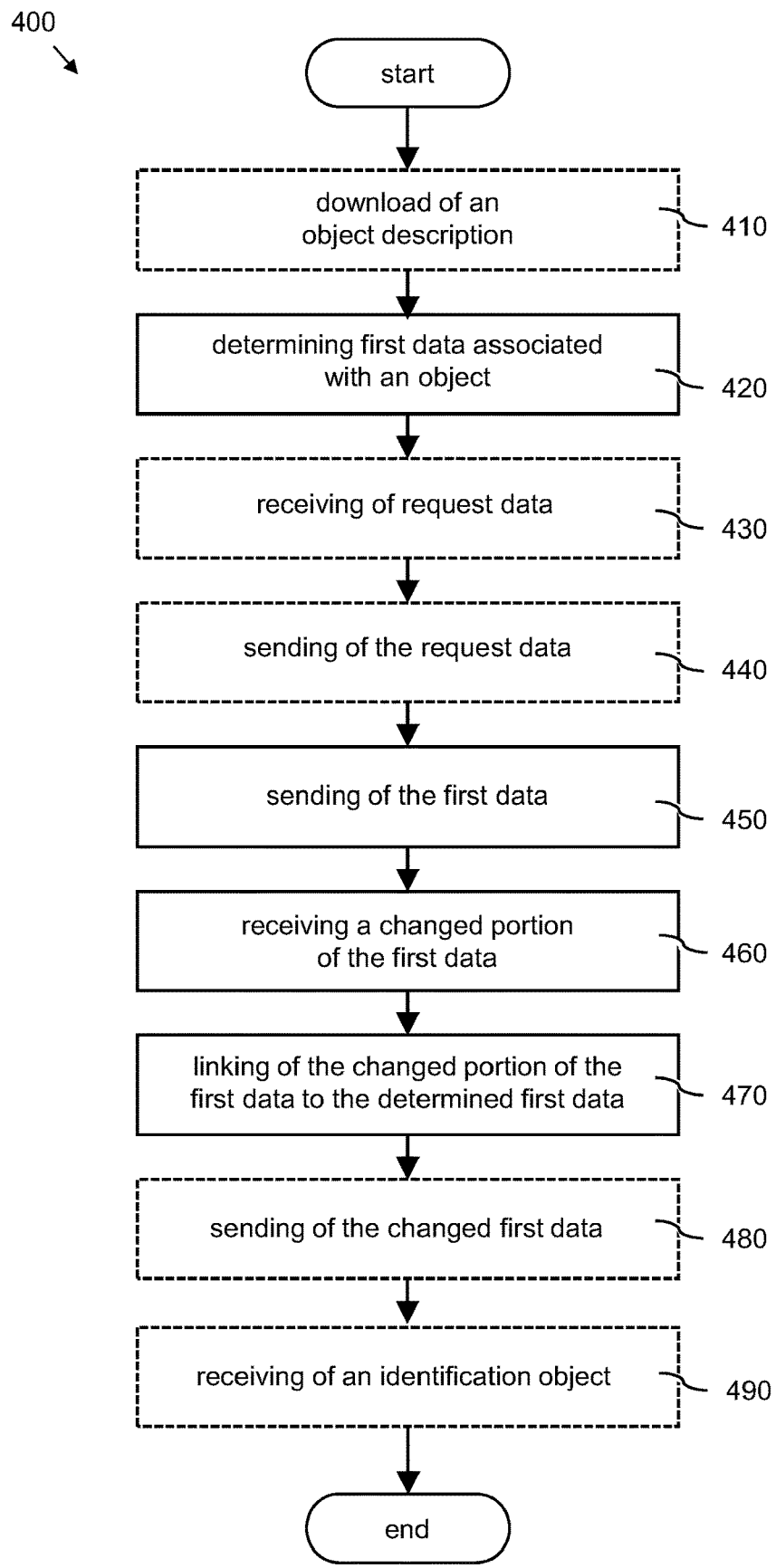
FIG. 4 shows a flow diagram for operating a first network node of the distributed merchandise management system as shown in FIGS. 1 and 2.

FIG. 4 shows a flow diagram for operating a first network node 110 of the distributed merchandise management system according to the invention as shown in FIGS. 1 and 2.

In a first optional step 410, an object description is downloaded from the cloud storage 105. This can be used, for example, for an offline part of the distributed merchandise management system at the first network node 110.

In a step 420, the first network node 110 determines first data associated with a physical object. This first data can be determined manually or automatically. For example, the first network node 110 has an input unit where the first data can be entered or scanned. It is also conceivable that the first data is determined by a merchandise management system already implemented at the first network node.

The first network node 110 can also be used as a relay for request data from a second network node 120. In this case, request data from a second network node 120 is received at the first network node 110 in step 430 and forwarded to the cloud storage 105 by the first network node 110 in step 440.

In a step 450, the first data determined in step 420 is sent to the cloud storage 105. For example, the first network node sends a quantity of a physical object to the cloud storage 105.

The cloud storage 105, as shown in FIG. 3, establishes a connection to the third network node 130 when incoming request data is received and receives second data from this third network node, which is adapted to change first data associated with a physical object. With this second data, the cloud storage 105 creates changed first data associated with the physical object, for example, the cloud storage 105 adjusts the price of the physical object. Then delta data is sent to the first network node 110. This delta data is received by the first network node 110 in step 460. In step 470, this delta data is linked to the first data relating to the physical object. This means that the price of the physical object can be adjusted based on request-specific manufacturer specifications.

Optionally, in step 480, the changed first data can be sent to a second network node 120. For example, it can be communicated to the second network node 120 that a changed request-specific price is present.

Optionally, an identification object can be received from the cloud storage 105 in step 490. Using this identification object, the second network node 120 can authenticate itself to the first network node 110 on the basis of which the first data was changed. This means that there may be a restriction with regard to the changed first data; for example, this data can only be made available to those who have made a corresponding request.

Figure 5:
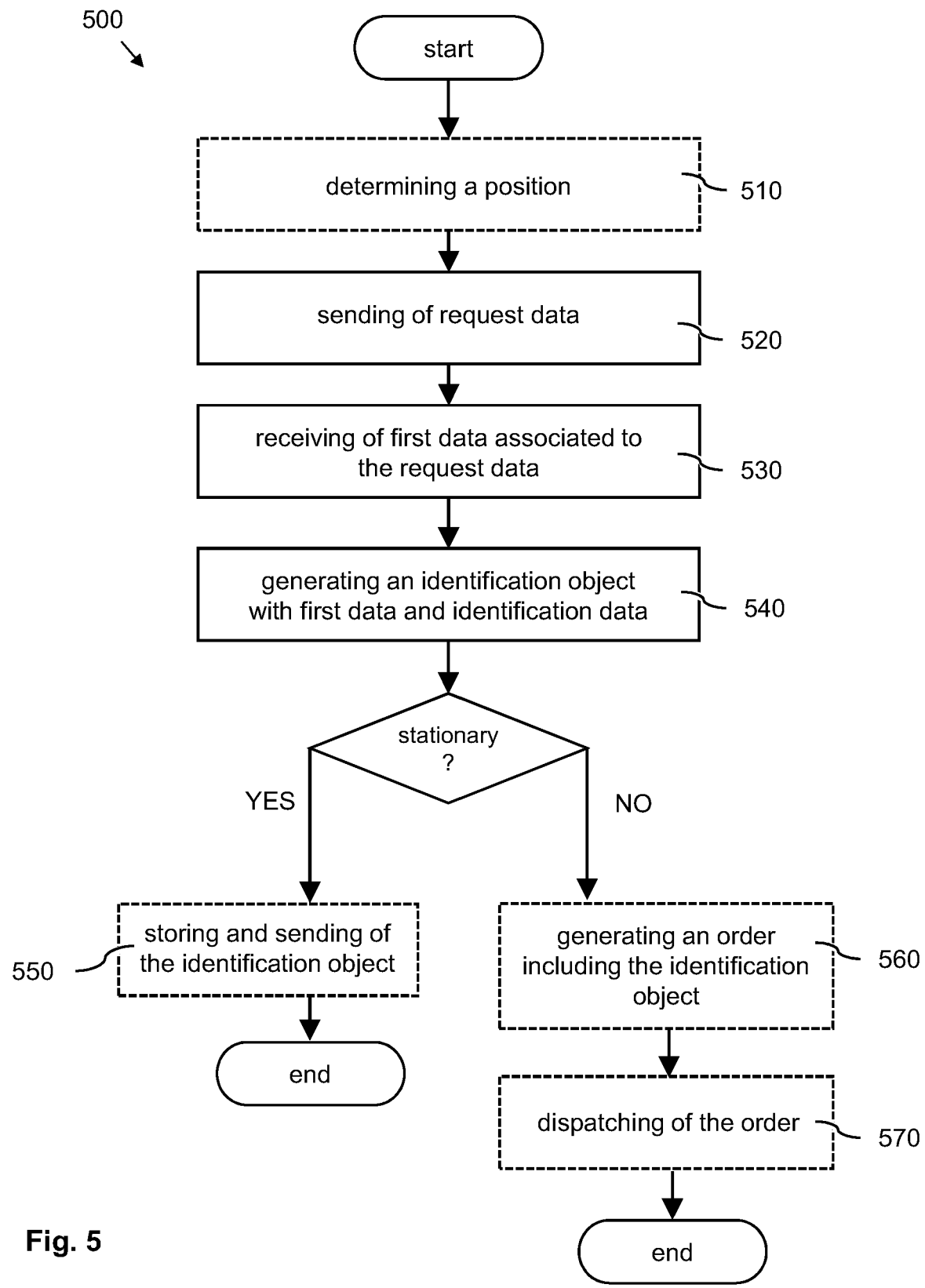
FIG. 5 shows a flow diagram for operating a second network node of the distributed merchandise management system as shown in FIGS. 1 and 2.

FIG. 5 shows a flow diagram for operating a second network node 120 of the distributed merchandise management system as shown in FIGS. 1 and 2.

In an optional first step 510, a position of the second network node 120 can be determined. The position determination can be a current or a predicted position of the second network node 120. The position can be determined, for example, with a GPS module of the second network node 120, or by an input at the second network node 120.

In step 520, the second network node 120 sends request data to the cloud storage 105. This request data can optionally contain the position data of the second network node 120 as well as non-optional data regarding at least one physical object. For example, the request data can contain a price and/or availability request regarding a physical object.

This request data is sent from the cloud storage 105 to the third network node 130, which generates second data based on the request data, which in turn is sent to the cloud storage 105 to change first data of a physical object. For example, the price of the physical object.

After receiving the second data from the third network node 130, the cloud storage 105 can change the first data and send it to the second network node 120 in response to the request data. This changed data is then received by the second network node 120 in step 530.

The second network node 120 can then generate an identification object in step 540, which contains the changed first data received from the cloud storage 105 and an ID of the second network node 120. This identification object can be stored in the form of a QR code, for example.

If the user of the second network node 120 decides to visit the stationary store, the identification object can be stored on the second network node 120 and sent to the cloud storage 105 in step 550. The identification object can then be used in stationary commerce to authenticate itself to the first network node 110. The identification object is used, for example, to enable the customer to verify his request and the subsequently received request-specific change in the price of a physical object to the retailer. For example, the retailer can scan the identification object using the first network node 110 and verify it via a request at the cloud storage 105 or compare it with an identification object received from the cloud storage 105.

If the user of the second network node 120 decides to visit the online store, an order can be generated in step 560 that includes the identification object. This makes it clear when placing the order that, for example, a request-specific modified price applies. In step 570, the order can then be dispatched.

Figure 6:
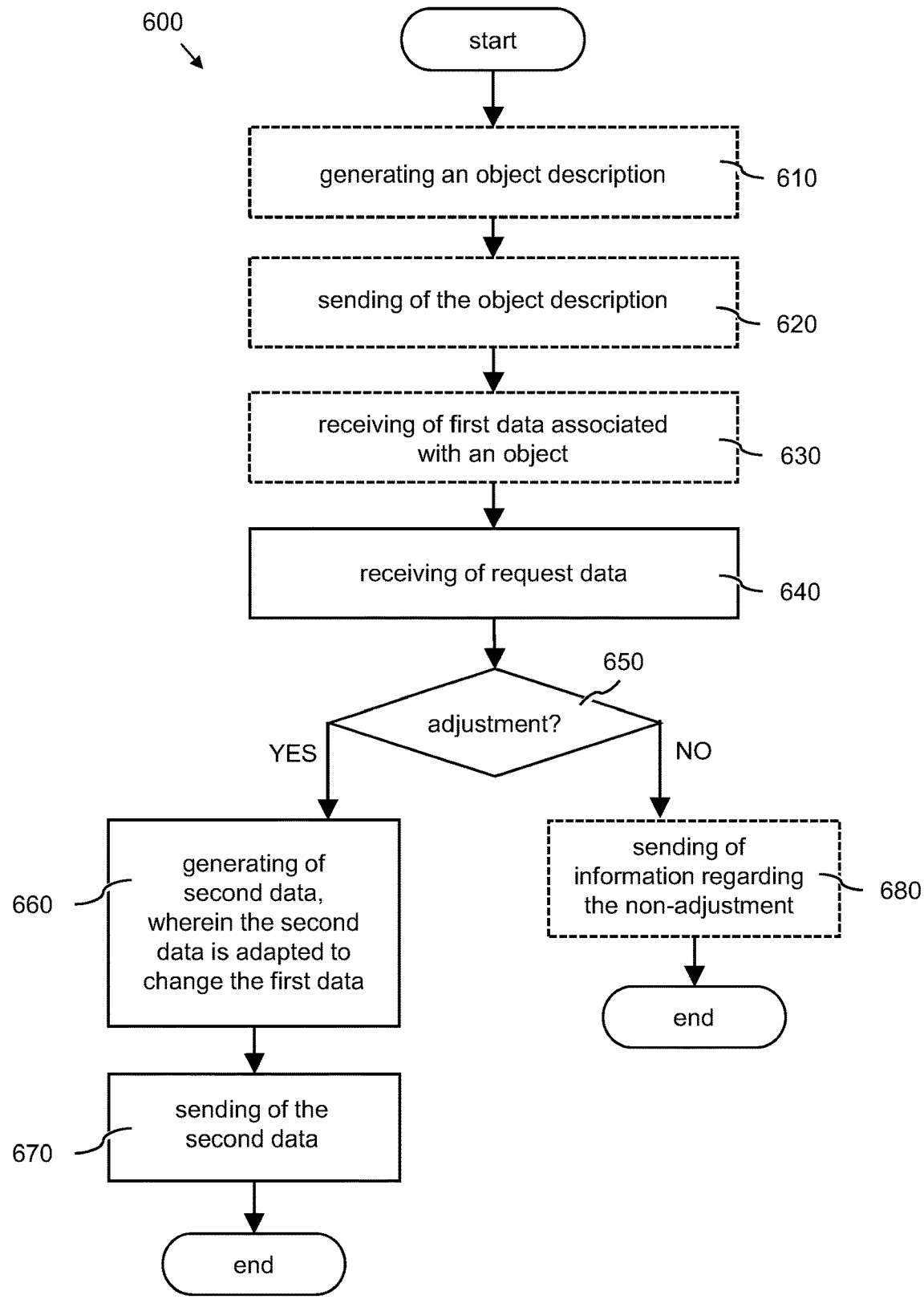
FIG. 6 shows a flow diagram for operating a third network node of the distributed merchandise management system according to the invention as shown in FIGS. 1 and 2.

FIG. 6 shows a flow diagram for operating a third network node 130 of the distributed merchandise management system according to the invention as shown in FIGS. 1 and 2.

In a first optional step 610, the third network node 130 can generate an object description of a physical object, and in step 620 send it to the cloud storage 105.

In a further optional step 630, the third network node 130 can also receive first data associated with a physical object from the cloud storage 105. For example, the current stock levels of a physical object can be requested at various first network nodes in the cloud storage 105. Through a comparison with the stock level system of the third network node 130 it can be determined whether the stock levels match the forecast distribution of goods. If deviations are detected, this is an indicator for possible grey market situations, i.e. goods have reached a retailer via an unauthenticated sales channel. It can also be used to detect possible product piracy, for example if physical objects appear in the cloud storage 105 for which there are no records at the third network node 130, or if duplicate first data records for physical objects appear.

Evaluating the first data over a period of time and/or region also allows the manufacturer to analyze stock levels, value-based sales, unit numbers and the sales price. This analysis can be done on the third network node 130, for example. However, it is also conceivable that this analysis is carried out on the cloud storage 105 and the result is made available to the third network node 130, either as portion of the first data, as separate data, or separately for downloading. The third network node 130 can also optionally send the cloud storage 105 at least one threshold value, if this value is exceeded or undershot, the cloud storage 105 sends a message to the third network node 130 so that the third network node can take appropriate action. Provided that first data from other manufacturers has been released for comparison on the cloud storage 105, this information can also be retrieved and compared in percentage or value terms.

In step 640, the third network node 130 receives request data relating to a physical object. This request data originates from the second network node 120 and was sent to the third network node 130 via the cloud storage 105.

Alternatively or additionally, the cloud storage 105 can also provide the third network node 130 with statistical evaluations of the request data such that the third network node 130 can be informed about the request situation. For example, the cloud storage 105 can evaluate which request data it has received for which physical objects or comparable physical objects. Here, the cloud storage 105 can make available all request data from second network nodes 120 in direction of comparable physical objects from different manufacturers in percentage or value terms, provided that the respective manufacturers have authorized this information for comparison in the cloud storage 105. Based on this information, manufacturers can optimize their marketing for a brand and/or product. For example, third party network nodes 130 can set regional thresholds in the cloud storage 105. If these thresholds are exceeded or undercut, the cloud storage 105 generates a message and sends it to the third network node 130 such that appropriate measures can be taken.

Based on the request data, a decision can be made in step 650 as to whether or not to adjust the first data of a physical object. For example, based on the number of requests regarding a physical object, the stock situation of a specific physical object, or other commercial considerations, an adjustment of the first data may be indicated.

In the event that an adjustment is to be made, second data is generated in step 660, which is capable of changing first data. These are then sent to the cloud storage 105 in step 670 to make the appropriate change. The second data can be delta data of the first data.

If it is decided in step 650 that no adjustment should be made, information regarding the non-adjustment can be sent optionally to the cloud storage 105 in step 680 to inform the cloud storage 105 that there will be no adjustment. However, it is also conceivable that the cloud storage 105 waits a certain time for a response from the third network node 130; if no second data is received during this time, the cloud storage 105 assumes that no adaptation of the first data has been performed by the third network node 130.

All data flows mentioned in the above-mentioned embodiment examples can be based on the EDI standard ANSI X 12 or on the UN EDIFACT standard.

The functions mentioned in the above-mentioned examples can be implemented in different ways, all these different implementations, as far as included in the scope of the attached claims, are to be understood as being in accordance with the invention.

The invention claimed is:

1. A method for operating a cloud storage system, wherein the cloud storage system includes a cloud storage that is in selective communication with at least a first network node, a second network node and a third network node, the method comprising:
receiving, at the cloud storage, encrypted first data from the first network node, wherein the encrypted first data is first data, associated with a physical object, that has been encrypted;
receiving, at the cloud storage, encrypted request data sent from the second network node, wherein the encrypted request data is request data, associated with the first data, that has been encrypted;
receiving, at the cloud storage, encrypted second data from the third network node, wherein the encrypted second data is second data that has been encrypted, wherein the second data is associated with the first data and comprising delta data, wherein the delta data includes one data piece adapted to change at least a portion of the first data, and wherein the delta data is based at least in part on the received request data and has a smaller bit number than the first data;
de-encrypting, by the cloud storage, the encrypted first data back to first data, the encrypted request data back to request data, and encrypted second data back to second data;
changing, by the cloud storage, the first data based at least in part on the second data; and
encrypting, by the cloud storage, the delta data to encrypted delta data;
sending, from the cloud storage, the encrypted delta data to the first network node, wherein the delta data are adapted to change the first data present at the first network node;
receiving, by the first network node, the encrypted delta data;
de-encrypting, by the first network node, the encrypted delta data back to the delta data;
determining, by the first network node, a change to the first data present at the first network node based on the delta data;
sending, from the cloud storage, the encrypted delta data to the second network node;
receiving, by the second network node, the encrypted delta data;
de-encrypting, by the second network node, the encrypted delta data back to the delta data;
generating, by the second network node, an identification object based on the delta data;
storing, by the second network node, the generated identification object;
sending, by the third network node, the encrypted delta data to the second network node, de-encrypting, by the second network node, the encrypted delta data back to delta data;
generating, by the second network node, the identification object based on the delta data, and storing, by the second network node, the generated a machine-readable code or a quick response (QR) code; and
wherein the cloud storage, first network node, the second network node, and the third network node are computing devices.

2. The method according to claim 1, further comprising:
receiving and saving an object description at the cloud storage, from the third network node.

3. The method according to claim 2, comprising:
sending, by the cloud storage, the encrypted received request data to the third network node before receiving the encrypted second data.

4. The method according to claim 1, wherein the request data comprises third data requesting an object data and location data of the second network node.

5. The method according to claim 4, wherein the location data comprises the current or predicted position of the second network node.

* * * * *